L. D. JONES.
VEHICLE SPRING.
APPLICATION FILED OCT. 22, 1914.
1,145,686.
Patented July 6, 1915.
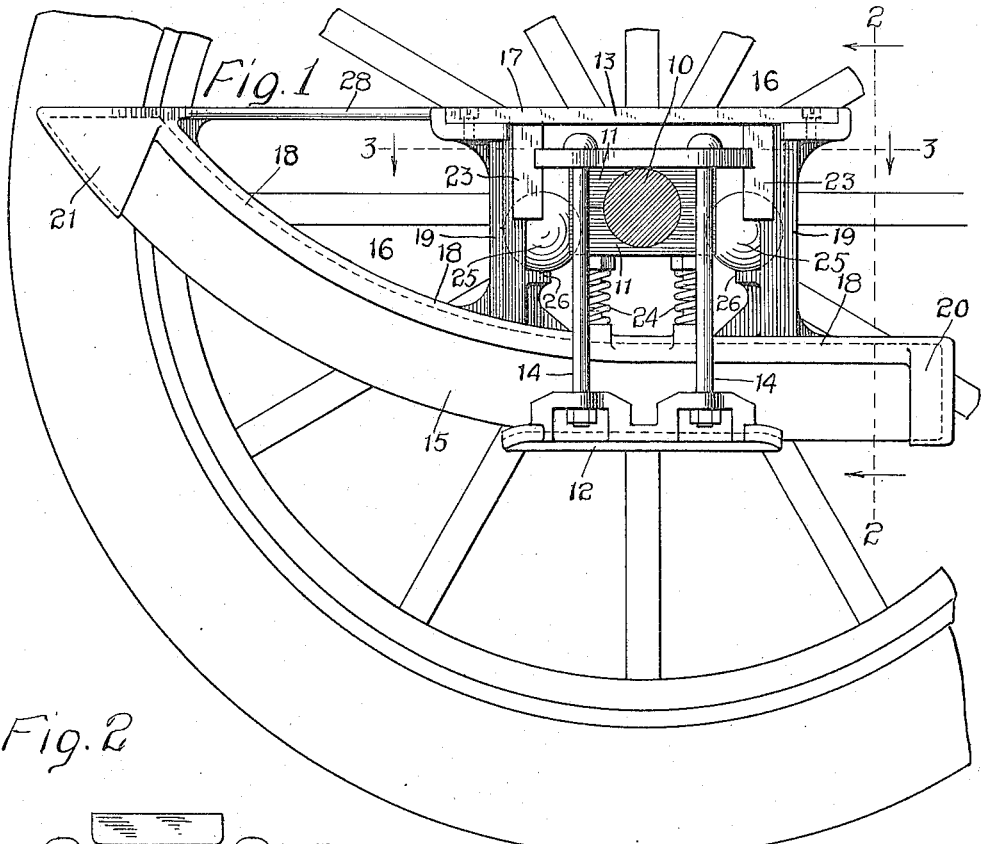
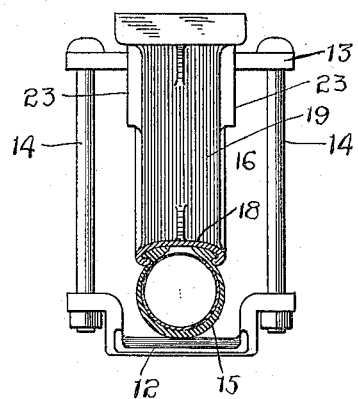
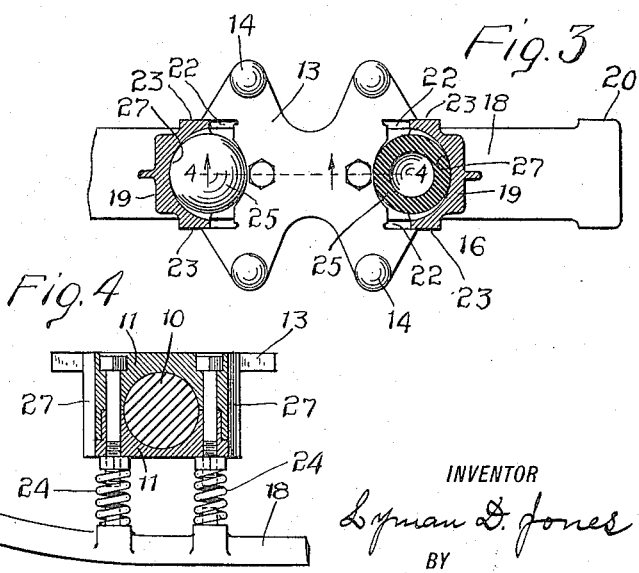
WITNESSES:
H. W. Meade
S. W. Atherton
INVENTOR
Lyman D. Jones
BY
A. M. Wooster
ATTORNEY

UNITED STATES PATENT OFFICE.

LYMAN D. JONES, OF BRIDGEPORT, CONNECTICUT.

VEHICLE-SPRING.

1,145,686.  Specification of Letters Patent.  Patented July 6, 1915.

Application filed October 22, 1914. Serial No. 868,056.

*To all whom it may concern:*

Be it known that I, LYMAN D. JONES, a citizen of the United States, residing at Bridgeport, county of Fairfield, State of Connecticut, have invented an Improvement in Vehicle-Springs, of which the following is a specification.

This invention has for its object to provide a spring adapted for general use upon all kinds of vehicles, and especially adapted for use upon motor cars and trucks, which may be used independently or in connection with other springs or as a shock absorber, lateral as well as vertical movement of the weight carrying frame relatively to the axle being provided for and means for taking up the rebound of both vertical and lateral movements.

With the above and other objects in view I have devised the novel and relatively inexpensive spring I am about to describe, which is exceedingly easy riding, has all the advantages of high grade pneumatic tires and in many instances will render the use of pneumatic tires unnecessary, thereby effecting important savings in the initial cost as well as in the running cost of motor cars and trucks.

In the accompanying drawing forming a part of this specification, Figure 1 is an elevation illustrating my novel spring as in use, the axle being shown in section; Fig. 2 a section on the line 2—2 in Fig. 1, looking in the direction of the arrows; Fig. 3 a section on the line 3—3 in Fig. 1, looking in the direction of the arrows, and Fig. 4 is a section on a line indicated by 4—4 in Fig. 3, looking in the direction of the arrows.

My novel spring comprises a support suspended from an axle, a pneumatic cushion carried by the support, a frame by which the weight is carried and which rests upon the cushion and has lateral as well as vertical movement relatively to the axle and yielding means between the axle and the frame for taking up the rebound of both the vertical and lateral movements of the frame.

10 denotes an axle, 11 an axle box and 12 the support. The specific details of construction are unimportant so far as the principle of the invention is concerned. In the present instance, I have shown the top member of the axle box as having a top plate 13 cast integral therewith and the support as suspended therefrom by means of bolts 14.

15 denotes a pneumatic cushion which may be of any ordinary or preferred construction as a section of a pneumatic tire.

16 denotes as a whole a frame which rests upon the cushion and carries the weight, that is the vehicle body or platform, and whatever may be carried thereby. It will be obvious that the special shape of the cushion and the frame is not of the essence of the invention but may be greatly changed to meet the taste of the manufacturer or the requirements of use, without departing from the principle of the invention. I have shown a frame shaped not unlike a bob sled and comprising an upper horizontal plate 17 which carries the body or platform of a vehicle (not shown, or another spring or springs for carrying a body or platform), a lower curved plate 18 which rests upon the cushion, uprights 19, a brace 28 connecting one of the uprights with plate 18, a socket 20 at the end of plate 18, which receives one end of the cushion, and a socket 21 at the intersection of brace 28 and plate 18, which receives the other end of the cushion. The ends of top plate 13 are provided with recesses 22 which receive and serve as guides for bearings 23 on the uprights. In order to yieldingly control the vertical movements of the frame relatively to the axle and to serve as a shock absorbing means, I interpose a cushion or spring 24, under compression, (in the present instance two coil springs) between the frame and the axle box, and in order to yieldingly control the lateral movements of the frame relatively to the axle and serve as an additional shock absorbing means, I interpose cushions or springs 25 (in the present instance resilient balls) between the axle box and the uprights. The uprights are shown as provided with ledges 26 upon which the balls normally rest and with curved vertically extending grooves 27, the curvature of the grooves being of greater radius than the balls, to permit the balls to flatten out in the grooves. The balls are preferably made of rubber quite thick but with central air spaces.

In use it is obvious that the strains, as when a wheel drops into a rut or strikes a stone, will be transmitted from the axle through the spring to the frame, and will impart both vertical and lateral movement thereto. The object of all vehicle springs is of course to reduce to the minimum the amount of movement imparted to the frame, platform or body by which the weight is carried. When a wheel drops into a rut or strikes an obstruction, the axle is moved vertically and the frame moves in the same direction immediately afterward and then moves in the opposite direction. There is also a tendency for the frame to move laterally relatively to the axle. The first movement of the body is taken up by the compression of pneumatic cushion 15 between the support and the frame. This first movement may be described as a movement of the frame and axle away from each other. An instant later the pneumatic cushion reacts and a return movement of the frame takes place, that is, the axle and frame move toward each other. This movement is taken up in my present structure by the interposition of a cushion or spring 24 (in the present instance two coil springs) between the axle box and plate 18 of the frame. Simultaneously with these vertical movements there is necessarily a tendency toward lateral movement of the frame relatively to the axle. In my present structure I provide yielding means, i. e. cushions or springs 25 (in the present instance resilient balls) between the axle box and the frame to take up this lateral motion. Bearings 23 are provided on the frame which slide in recesses 22 in the top plate of the frame, the walls of the recesses serving as guides for the frame during these lateral movements. By thus providing for lateral as well as vertical movements of the frame relatively to the axle and by providing means for taking up the return movement or rebound of both lateral and vertical movements, I insure a quality of easy riding that has not heretofore been attained by any vehicle spring known to the trade.

Having thus described my invention I claim:—

1. A vehicle spring comprising an axle box, a support suspended therefrom, a cushion resting on the support, a frame resting on the cushion and comprising upper and lower plates, uprights, a brace connecting the upper and lower plates and sockets at the end of the lower plate and at the intersection of the brace and lower plate which receive the ends of the cushion, and resilient means between the axle box and the uprights and lower plate for taking up the rebound of the frame.

2. A vehicle spring comprising an axle box, a support suspended therefrom, a cushion resting on the support, a frame resting on the cushion and comprising uprights having ledges and vertical grooves, resilient balls in the grooves which engage the axle box and rest on the ledges and springs between the axle box and the frame.

3. A vehicle spring comprising an axle box having a top plate with recesses in its ends, a support suspended therefrom, a cushion resting on the support, a frame resting on the cushion and having bearings engaging the recesses, for the purpose set forth, and resilient means between the axle box and the frame for taking up the lateral and vertical rebound of the frame.

In testimony whereof I affix my signature in presence of two witnesses.

LYMAN D. JONES.

Witnesses:
  H. W. MEADE,
  E. M. CULVER.

Copies of this patent may be obtained for five cents each, by addressing the "Commissioner of Patents, Washington, D. C."